United States Patent

[11] 3,554,135

| [72] | Inventors | William C. Duvall;<br>Stephen L. Tomcsak, Akron, Ohio |
|---|---|---|
| [21] | Appl. No. | 764,147 |
| [22] | Filed | Oct. 1, 1968 |
| [45] | Patented | Jan. 12, 1971 |
| [73] | Assignee | The Goodyear Tire & Rubber Company<br>Akron, Ohio<br>a corporation of Ohio |

[54] SHORING DEVICE
12 Claims, 11 Drawing Figs.

[52] U.S. Cl................................................. 105/369,
214/10.5
[51] Int. Cl..................................................... B60p 7/14,
B61d 45/00
[50] Field of Search........................................ 105/369
(BI); 214/10.5(I); 206/(Inflatable Digest); 5/348

[56] References Cited
UNITED STATES PATENTS

| 2,856,867 | 10/1958 | Dasey........................... | 105/369(BI) |
| 2,874,826 | 2/1959 | Matthews et al.............. | 206/1 |
| 3,018,492 | 1/1962 | Rosen........................... | 5/348X |
| 3,089,153 | 5/1963 | Bosc.............................. | 5/348 |
| 3,145,853 | 8/1964 | Langenberg................... | 214/10.5(I) |
| 3,331,087 | 7/1967 | Barlow.......................... | 5/348X |
| 3,427,997 | 2/1969 | Brown, Jr. et al............. | 105/369(BI) |
| 3,440,976 | 4/1969 | Burne............................ | 5/348X |
| 3,462,027 | 8/1969 | Puckhaber.................... | 214/10.5(I) |

Primary Examiner—Drayton E. Hoffman
Attorneys—F. W. Brunner and Ronald P. Yaist

ABSTRACT: An inflatable member having a body composed of opposed plies of air impervious, pressure retaining flexible material which are joined together along their peripheral edges to form a seam around the entire body of the member. The member has at least two pneumatic chambers with at least one crossover connecting any two such chambers and a single valve means connected with the body through the seam. The principal application for the inflatable members of this invention is as a dunnage device for shoring merchandise, for instance, in the storage compartment of a transport vehicle or in a warehouse. Each chamber of the plural-chambered device is the size and capacity of the ordinary single inflatable dunnage bag but inflation and deflation of the device is accomplished through a single valve assembly. Since the valve extends through the seam of the dunnage device it is readily accessible to the source of the inflating medium for inflating the bag. These devices are also designed with an open area between each pair of chambers so that the device may be positioned to avoid obstructing or interfering structures in the storage area.

PATENTED JAN 12 1971

INVENTOR.
WILLIAM C. DUVALL
STEPHEN L. TOMCSAK
BY
R. P. Yaist
ATTORNEY

INVENTOR.
WILLIAM C. DUVALL
STEPHEN L. TOMCSAK
BY
R. P. Yaist
ATTORNEY

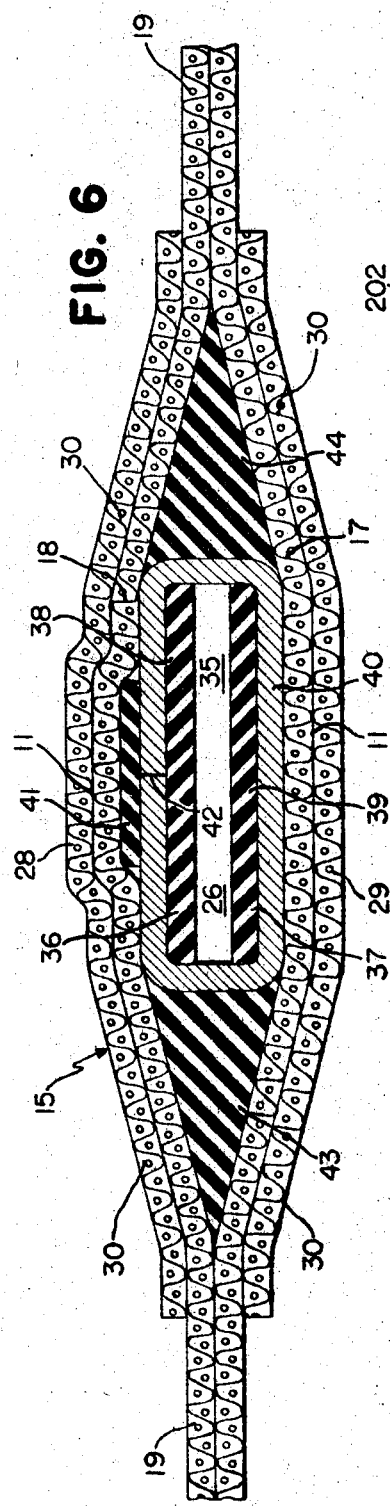
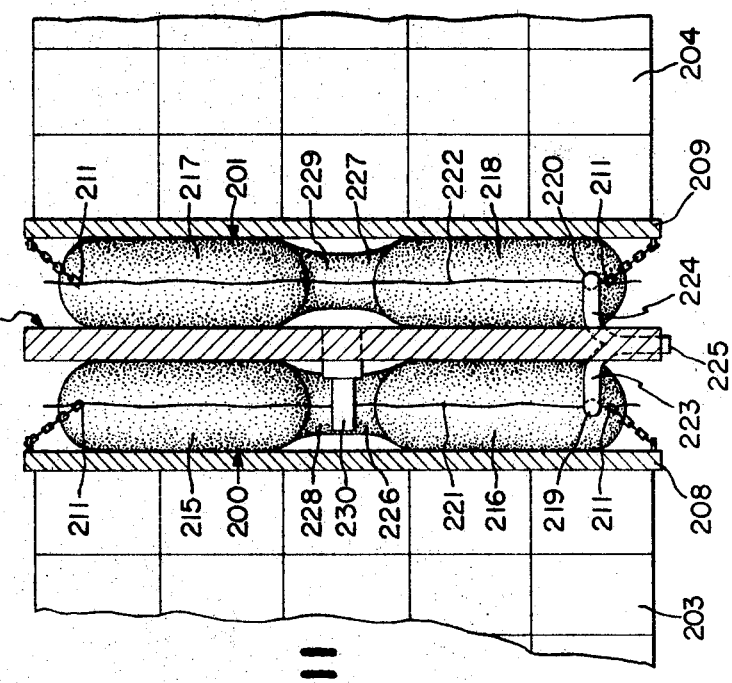
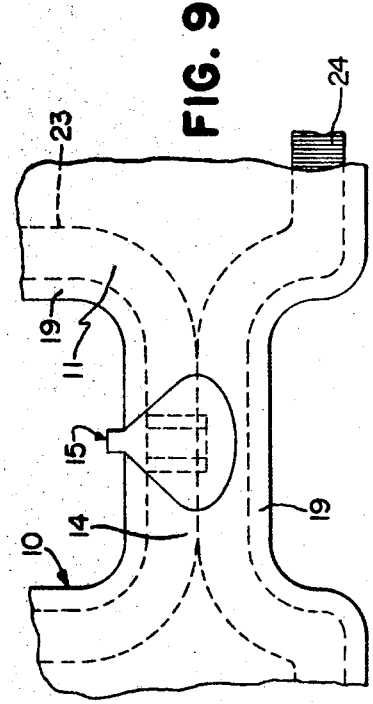
INVENTOR.
WILLIAM C. DUVALL
STEPHEN L. TOMCSAK
BY
R. P. Yaist
ATTORNEY

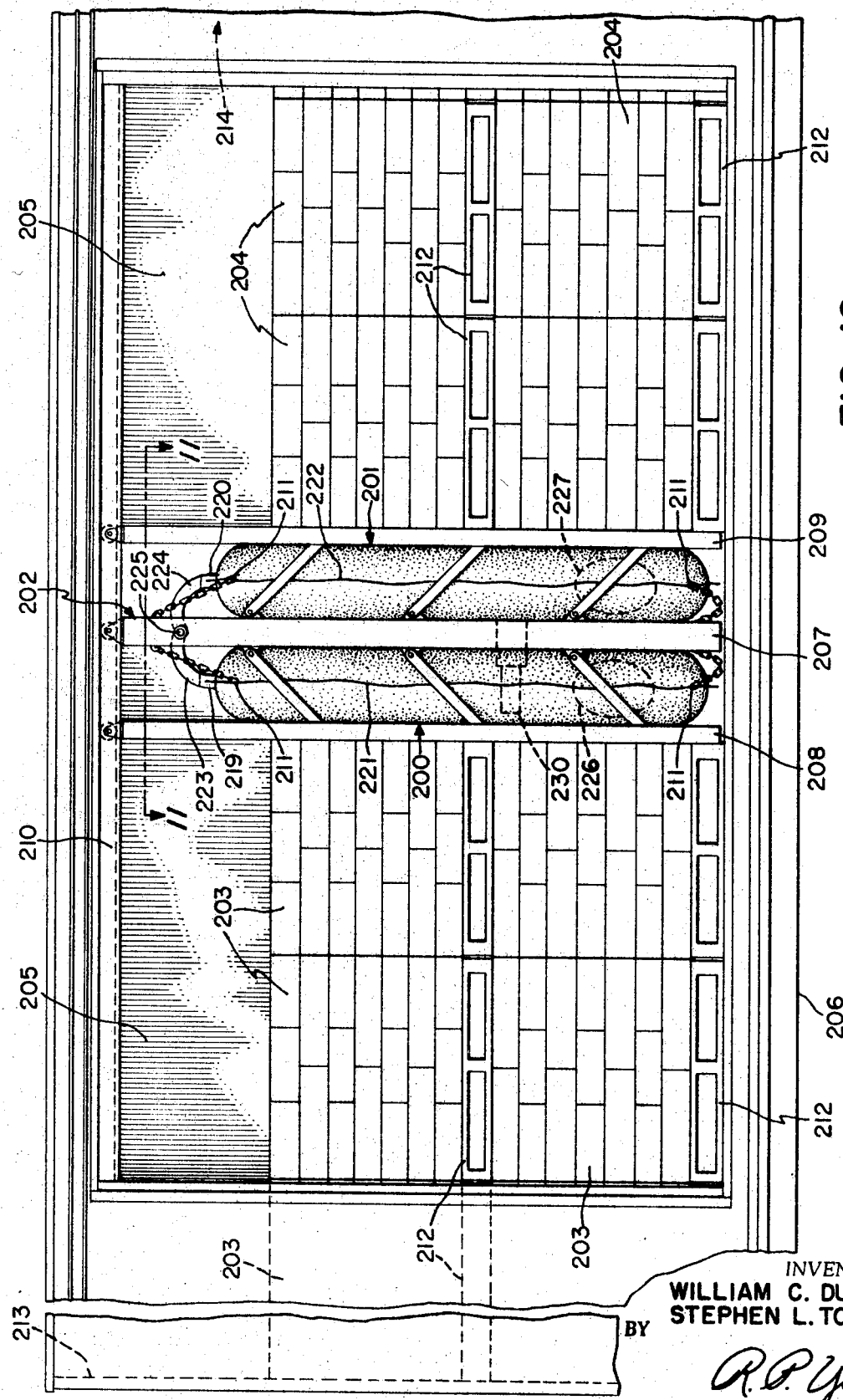

SHORING DEVICE

BACKGROUND OF THE INVENTION

This invention relates to inflatable members of flexible material for shoring merchandise in a storage facility. More specifically this invention relates to inflatable dunnage devices used to shore merchandise in the cargo compartments of transport vehicles, such as railroad box cars, trucks, tractors and ships.

Pneumatic dunnage devices, commonly referred to as dunnage bags, are typically used in place of conventional wooden shoring and bracing in the cargo compartments of transport vehicles to shore such items as steel drums, paper rolls, pallets of bricks, and materials contained in cartons. Dunnage bags are normally composed of two opposing flexible plies of air impervious, pressure retaining material which are joined together along their peripheral edges to form a seam therearound with a pneumatic or an air chamber therebetween. A valve is provided in the body of the bag in order that the chamber may be inflated with any of the appropriate inflation media and subsequently deflated after service.

The bags are generally constructed of textile fabric material either woven or in cord form which has been impregnated with elastomeric material such as natural or synthetic rubber or other rubberlike materials such as polyvinyl chloride or polyurethane. Any of the ordinary types of textile fabric materials commonly used to provide strength such as cotton, nylon, rayon, and polyester are suitable for this purpose.

In operation, the dunnage bags are placed while uninflated in various locations, for instance, edgeways between stacks of merchandise or between the merchandise and the wall of the compartment. Once installed they function to compact the merchandise and absorb impact and shock to prevent damage thereto. One of the most common arrangements is to stack the merchandise against the walls of the compartment and then prevent any lateral or horizontal movement of the load by pressing the merchandise firmly against the walls. This is accomplished by means of an inflated dunnage bag placed edgeways with its body or face directly contacting one face of the merchandise, or by employing a pneumatic bulkhead system in which one or more dunnage bags force a metal panel against the load. One such system, for example, utilizes a single movable bulkhead having two pairs of individual dunnage bags each pair of which force opposing outer panels of the bulkhead against the load which is located at opposite ends of a railroad box car. In these previously mentioned arrangements the merchandise is thus maintained in position by the coacting faces of the inflatable dunnage device and the merchandise being stored.

The dunnage devices formed from rubberized fabric have definite advantages over the more conventional structures from the standpoint of loading and shipping costs, speed of loading and unloading, and reduction of shipping damage. However, some problems have been encountered with the present-day devices. For instance, when a plurality of individual dunnage bags are required, as for instance in a pneumatic bulkhead system as previously described, it is necessary that each bag be equipped with a separate inflation valve and other attendant accessories. Those familiar with the art well know the economic disadvantage this problem presents. Furthermore, since each bag has its own valve assembly the possibility of leakage is increased.

In addition, because the bags are usually placed edgeways between the stacks of merchandise and since the valve is positioned in the body of the bag with the valve stem extending from the body at right angles thereto, it is often difficult to reach in the narrow spaces available between stacks of merchandise. Therefore, inflation and deflation become particularly inconvenient.

It has been found that the aforementioned problems are solved by a special dunnage bag construction which includes the combination of (1) a body having at least two separate pneumatic chambers with at least one crossover connecting any two such chambers, and (2) a single valve means operably connected with the body through the edge or pinch seam. Each chamber is the size and capacity of the ordinary single dunnage bag and since they are pneumatically interconnected only one valve assembly is required to inflate or deflate the entire bag, thus decreasing the chances of leakage in the valve area. Of course, with the ordinary dunnage bag a separate valve assembly is required for each individual bag. Also since the valve stem extends through the edge or pinch seam instead of through the body of the bag it provides a readily accessible connection to a source of the inflating medium for inflating the bag. Consequently the bag may be much more easily inflated or deflated while in service. Also in this plural-chambered arrangement it is possible to position the valve through any portion of the edge seam either in one of the air chambers or through the edge seam of one of the crossovers connecting the chambers.

Other versatile features of the present invention should also be apparent. For instance, the bag may be designed in a number of shapes depending upon such factors as the type of cargo, the size and shape of the cargo compartment and the particular bulkhead arrangement being employed. The inflatable member of the present invention contains an open area between any two air chambers, with the crossover located usually either toward the top or bottom so that the usual configuration of the structure is of U-shape whereby the bag may be positioned to avoid obstructing or interfering devices which may be present in the storage area. Moreover any number of these devices may be employed either together or in combination with other more conventional single-chambered devices depending upon the requirements of the particular application.

Although the principal use of the inflatable members of this invention is for shoring merchandise contained in a transport vehicle, they may also be used for the same purpose in warehouses or other stationary storage facilities. They may also find application as a flotation member for transporting items such as concrete pipe over bodies of water.

OBJECTS OF THE INVENTION

It is an object of the present invention to provide an inflatable member of special design which may be conveniently and economically used for shoring merchandise in a storage area where the size, shape or spacing of the merchandise makes the use of ordinary dunnage devices inappropriate.

It is another object of this invention to provide an inflatable plural-chambered dunnage device which may be inflated through a single valve means to thus eliminate or materially reduce the number of valve assemblies and accessories thereby minimizing the possible points of leakage, and which also can be more conveniently inflated and deflated in narrow spaces between the stacks of merchandise.

It is a further object of this invention to provide an inflatable plural-chambered dunnage device to be used in a pneumatic bulkhead system of a transport vehicle, which may be conveniently positioned so as to avoid obstructing devices present in the transport vehicle and also may be conveniently inflated and deflated while in service in such system.

Other objects and advantages of this invention will become apparent hereinafter as the description thereof proceeds, the novel features, arrangements and combinations being clearly pointed out in the specification as well as the claims thereunto appended.

Figure 1:
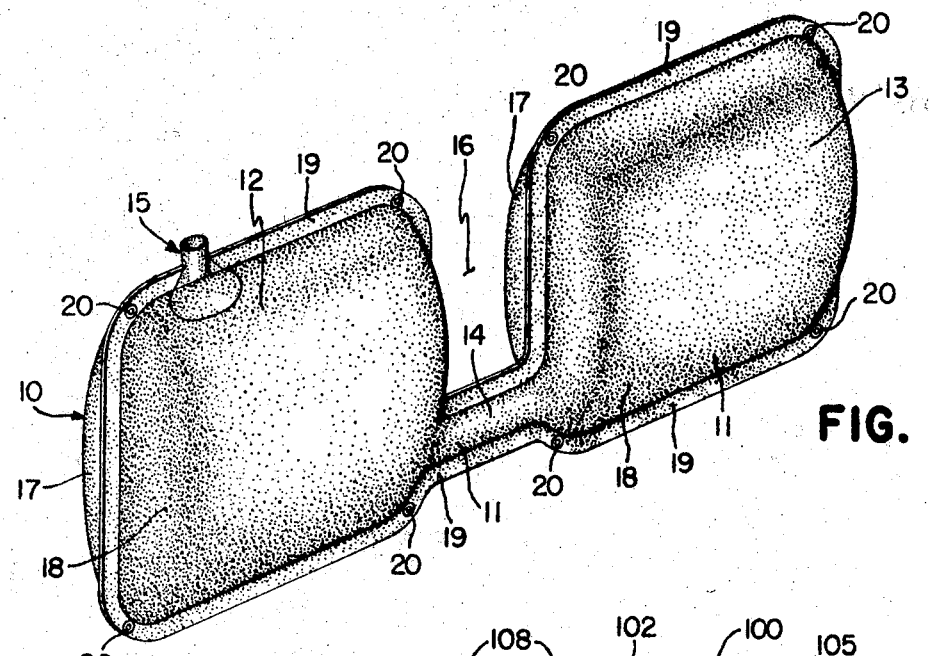
FIG. 1 is a perspective view of the inflatable member of this invention.

g. 3 is a fragmentary plan view of the invention shown in FIG. 1.

Figure 4:
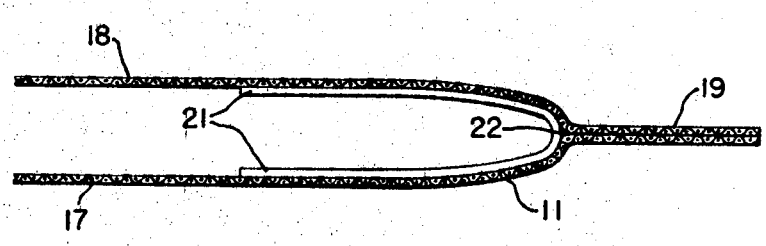
Figure 5:
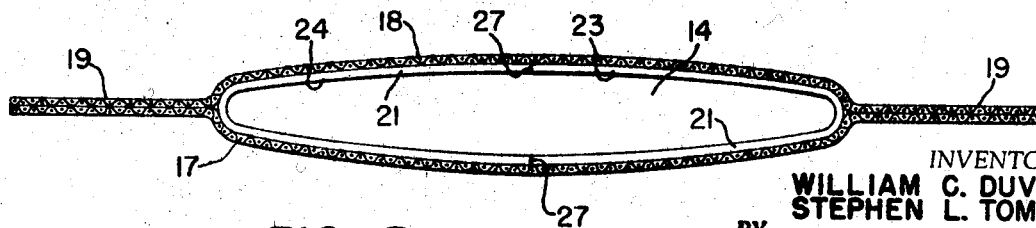
Figure 3:
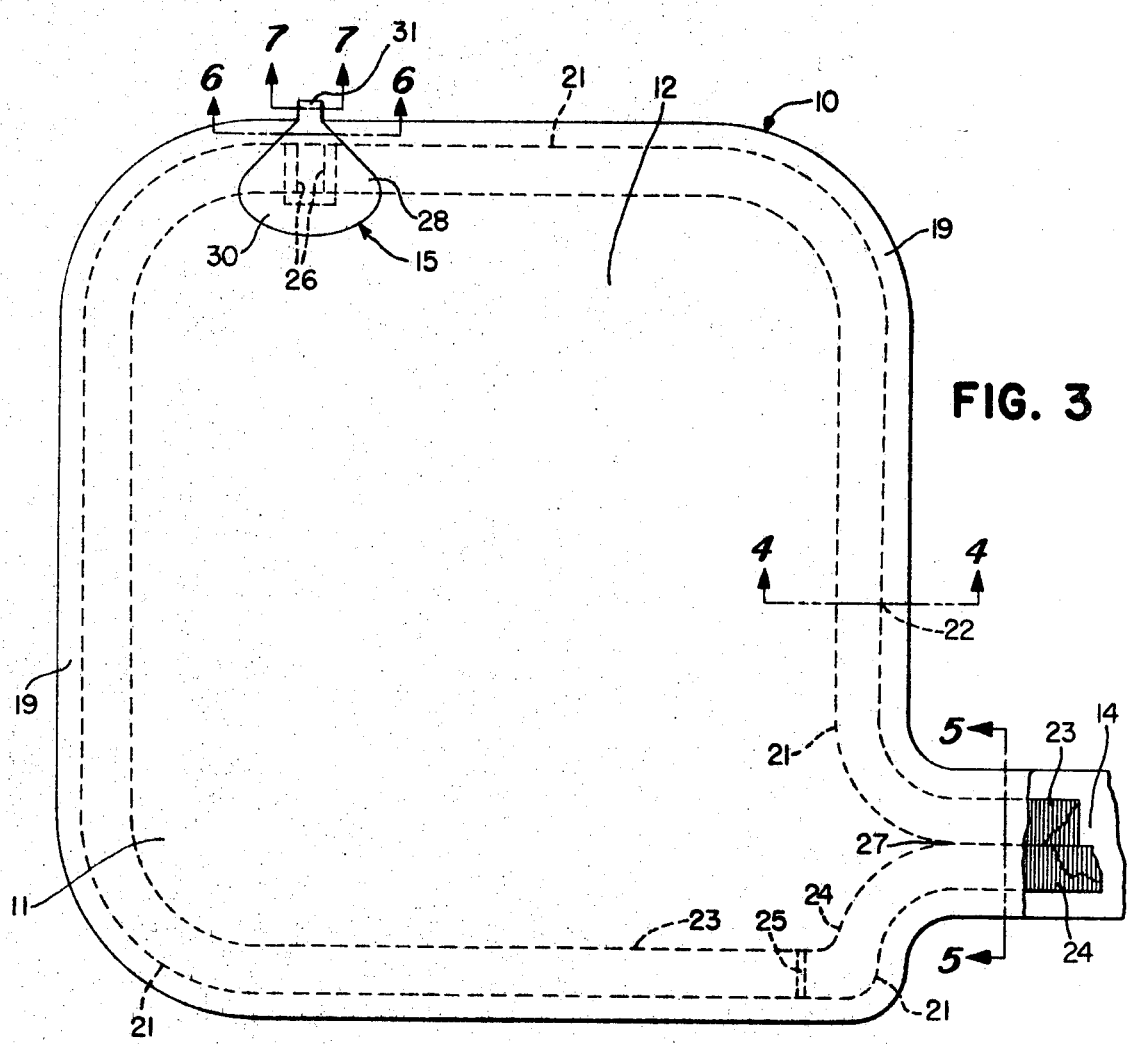
Figure 8:
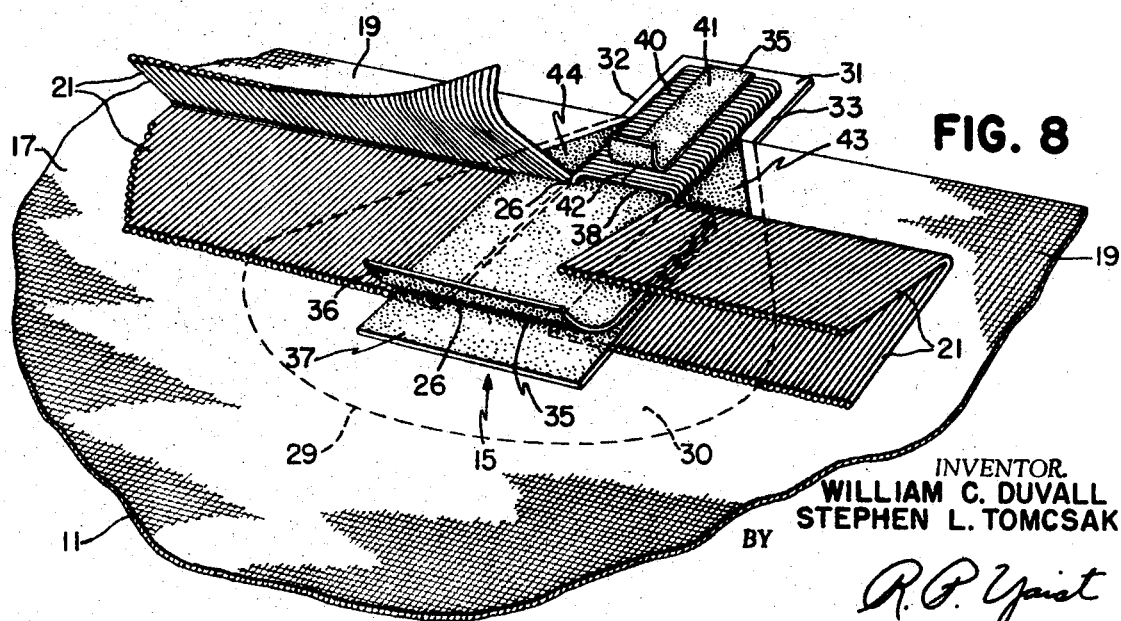

FIG. 4 is an enlarged section taken on line 4–4 of FIG. 3.
FIG. 5 is an enlarged section taken on line 5–5 of FIG. 3.
FIG. 6 is an enlarged section taken on line 6–6 of FIG. 3.
FIG. 7 is an enlarged section taken on line 7–7 of FIG. 3.
FIG. 8 is a perspective view with parts broken away showing the valve assembly of this invention.
FIG. 9 is a modification of the invention shown in FIG. 3.
FIG. 10 is a side elevational view showing a typical application for the inflatable members of this invention.
FIG. 11 is a fragmentary plan view taken on line 11–11 of FIG. 10 which more clearly illustrates the typical application of the invention.

DESCRIPTION OF THE PREFERRED EMBODIMENTS

In FIG. 1 the plural-chambered dunnage bag 10 of this invention of the type used to shore merchandise in a compartment of a transport vehicle is shown in its inflated form. In this instance, the bag 10 includes a body 11 having two pneumatic chambers 12 and 13 connected by a crossover port 14 and a valve 15 connected with the body 11 in order that the bag 10 may be inflated by an appropriate inflating medium and subsequently deflated after service. As is apparent the inflating medium, usually air, is passed under pressure through the valve 15 and fills chamber 12 and flows through the crossover port 14 and fills chamber 13. The body 11 has a generally open area 16 between the chambers 12 and 13 and the crossover port 14 as shown is located toward the bottom of the open area 16 in the lower portion of the body 11 so that the bag is generally of U-shaped configuration. The open area allows the bag to be positioned to avoid mechanical devices or other apparatus associated with the transport vehicles which would otherwise interfere with the operation of the bag 10.

The body 11 of the bag 10 is formed from opposed plies 17 and 18 of square woven nylon fabric which has been impregnated with natural or synthetic elastomeric material and vulcanized to provide an air impervious inflatable member. Of course, other well-known textile fabric materials may be used for this purpose such as cotton, rayon, polyester, or combinations thereof. A sealed edge or pinch seam 19 is formed around the entire body 11 of the bag 10 by joining the sheets 17 and 18 along their peripheral edges. Thereby a completely pressure retaining device is provided having a pinch seam 19 which follows the contour of chamber 12, crossover port 14 and chamber 13. Eyelets 20 are also provided in the pinch seam 19 as means to attach and secure the bags 10 when in service, for example, in a cargo compartment of a transport vehicle.

Figure 2:
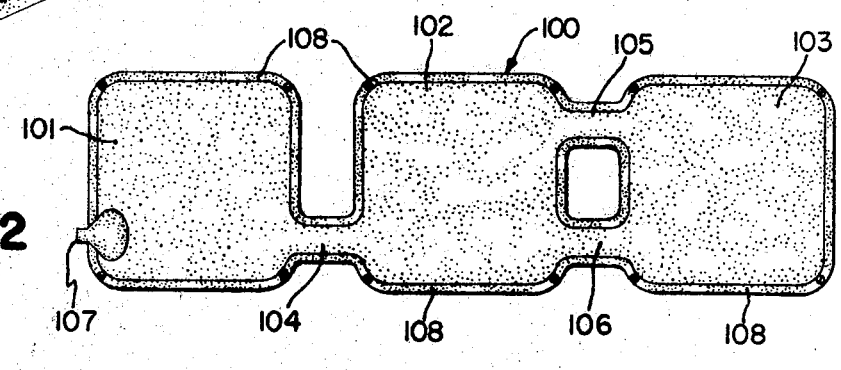
FIG. 2 is a plan view of another form of the invention shown in FIG. 1.

It is to be understood that the inflatable member of this invention may also include more than two pneumatic chambers and more than one crossover port with the number of chambers and crossovers depending upon the particular application. This is shown in FIG. 2 which illustrates a dunnage bag 100 having chambers 101 and 102 connected by the crossover port 104 and chambers 102 and 103 connected by two crossover ports 105 and 106. Valve 107 connected through pinch seam 108 provides a single inflation and deflation means for the chambers 101, 102, and 103 of the bag 100.

In FIG. 3 the preferred construction of the bag 10 is shown in more detail particularly indicating its internal construction as exemplified by the chamber 12 of the body 11 of the bag 10. Preferably an elongated tape or strip 21, for example, of rubber-coated tire cord or square-woven fabric having a generally V-shaped configuration, commonly known as a "-crotch strip" extends substantially around the entire interior periphery of the bag 10 and is adhered thereto by means of a suitable adhesive prior to vulcanization. As is shown in FIG. 4, the strip 21 fits into the crotch-like contour formed by the body 11 immediately adjacent the pinch seam 19 of the sealed outer edges of the bag 10 and provides the necessary reinforcement for the bag 10 in the seam area 22 to guard against leaks and insure the proper retention of pressure. The strip 21 may be one continuous elongated piece but ordinarily is made up of several segments spliced together end-to-end. For example, as illustrated in FIG. 3 segments 23 and 24 of the strip 21 are joined together to form a lap splice 25. The strip 21 follows the contour formed by the pinch seam 19 enclosing the chamber 12, the crossover port 14 and the chamber 13 (not shown) but is discontinuous in the area 26 of valve 15 in order to provide an inlet to the chamber 12 of the bag 10. FIG. 5 shows the preferable arrangement of the strip 21 in the crossover port 14 with separate segments 23 and 24 of the strip 21 being joined together longitudinally in the splice area 27 to form the internal reinforcement for the crossover port 14 of the body 11. Other arrangements are possible, for example, if the diameter of the crossover port 14 is large a fabric insert may be required between the segments 23 and 24 of the strip 21.

The valve 15 is attached to the body 11 of the bag 10 directly through the pinch seam 19 and into the chamber 12 instead of through the body 11 as has been customary and therefore may be more conveniently connected to an outside inflation source as will be hereinafter explained.

The construction of the valve 15 is shown in FIGS. 6, 7 and 8. In this instance a pair of sleeve patches 28 and 29 preferably of rubber impregnated square-woven textile fabric provide a cover for the valve 15. In order to properly distribute the stresses which are created, each patch 28 and 29 has a configuration which includes a relatively wide bulbular portion 30 and a more narrow neck portion 31. This feature is most clearly shown in FIG. 3. Of course, many other shapes are possible with this particular configuration being only exemplary. The portions 30 of the patches 28 and 29 are attached to the exterior surfaces of each ply 17 and 18 respectively of the body 11, or if desired may also similarly be attached to the interior surfaces of the plies 17 and 18. FIG. 7 illustrates that the edges 32 and 33 of portions 31 of the patches 28 and 29 respectively are adhered together to form portion 34 which extends beyond the outer edge of the pinch seam 19 of the body 11. Thereby a passage 35 is formed which together with open area 26 provides an inlet into the interior of the body 11 of the bag 10 as for instance into chamber 12. The extended portion 34 is subsequently connected to a valve stem (not shown) to provide a means to inflate and deflate the bag 10.

In FIG. 8 the sleeve patch 28 and the ply 17 have been removed to more clearly illustrate the internal construction of the valve 15. As shown, included interiorly of the sleeve patches 28 and 29 are a pair of reinforcing sleeve elements 36 and 37 preferably of gum rubber which during vulcanization are adhered to the ends of the V-shaped strip 21 in order to prevent leakage. The elements 36 and 37 include elongated portions 38 and 39 respectively which extend into the interior of the extended portion 34 of the sleeve patches 28 and 29. During vulcanization a suitable separator (not shown) is placed between elements 36 and 37 to prevent them from bonding together and thereby closing passage 35 and open area 26. In most instances in order to provide the necessary strength a layer 40 of rubber-covered tire cord fabric material is wrapped firmly around the elongated portions 38 and 39 of the elements 36 and 37 and is adhered to at least the extended portion 34 of the sleeve patches 28 and 29 by means of a suitable adhesive. In addition, it is also preferable to provide a relatively small strip 41 of gum rubber which during vulcanization seals the butt seam 42 of the wrap layer 40. Also, it is usually good practice to position fillers 43 and 44 of gum rubber to act as seals in the proximities of area 26 where the valve 15 extends through the strip 21 and the pinch seam 19 of the body 11.

Various valve stem assemblies may be attached to the extended portion 34 of the sleeve patches 28 and 29 such as a hose or other tubular conduit to permit inflation of the bag by means of standard inflating devices and deflation after service.

The valve 15 may, in addition to being attached to the body 11 of the bag 10 through the seam 19 of one of the pneumatic chambers 12 (or 13) as shown in FIG. 3, be attached through the seam 19 of the crossover port 14 as shown in FIG. 9. The location of the valve 15 will be determined by the particular application with primary consideration being given to the most convenient location for controlling the inflation and deflation of the dunnage device. Since the bag 10 has only a single valve 15 the possibility of leakage is less than when two single bags are employed each having a separate valve assembly.

It is to be understood that any of the standard building and vulcanizing procedures common in the art may be used in manufacturing the inflatable devices of this invention. The particular method used will be largely determined by the customary practices of the particular manufacturers.

In FIGS. 10 and 11 a typical application for the inflatable member of this invention is shown, In this particular application two dual-chambered bags 200 and 201 are being used in conjunction with a bulkhead 202 as part of a pneumatic bulkhead system to shore stacks of merchandise 203 and 204 in the cargo compartment 205 of a transport vehicle 206.

The bulkhead 202 includes center element 207 and two outer panels 208 and 209 and is made mobile by being operably connected to an overhead track 210. The dunnage bags 200 and 201 are secured in position edgeways between the center element 207 and the outer panels 208 and 209 by means of the eyelets 211. In this instance, as illustrated, the bulkhead 202 is positioned in the center of the cargo compartment 205 between the cartons of merchandise 203 and 204 which have been stacked on pallets 212. In and when the bag 200 is inflated it expands against the outer panel 208 which in turn forces the stacks of merchandise 203 against the wall 213 of the cargo compartment 205 of the transport vehicle 206 and maintains constant pressure against the stacks of merchandise 203. Similarly, the bag 201 expands against the outer panel 209 which exerts pressure against the stacks of merchandise 204 in the opposite end of the cargo compartment 205 thereby forcing them against the opposite wall 214. In this way, the merchandise 203 and 204 is compacted preventing shifting and damage due to shock and impact in transit is minimized or eliminated.

As best illustrated in FIG. 11 the chambers 215 and 216 of the bag 200 and chambers 217 and 218 of bag 201 each have the capacity of a single conventional dunnage device and therefore each bag 200 and 201 is equivalent to two standard sized bags. Accordingly, only two bags are required instead of the four single bags as previously employed in such a system. Each bag 200 and 201 can be inflated through a single valve means 219 and 220 respectively extending from the edge or pinch seams 221 and 222 in the upper portion of each bag 200 and 201 respectively. Conduits 223 and 224 are connected to the valves 219 and 220 respectively and are suitably connected to a main inflation valve 225 provided on the center element 207 which receives air or other inflating media from an outside source (not shown). Consequently by employing the dual-chambered bags 200 and 201 in place of the four single bags which require four connecting hoses or conduits the possible points of leakage are reduced.

The crossover ports 226 and 227 in this instance are located toward the bottom of the bags 200 and 201 respectively so that the bags 200 and 201 are of generally U-shaped configuration. Accordingly the open areas 228 and 229 above the crossovers 226 and 227 respectively allow space for the positioning of interfering or obstructing mechanical devices such as an actuating apparatus 230 attached to the center element 207 of the bulkhead 202. In this regard it should be apparent to those skilled in the art that the specific design of the dunnage bags 200 and 201 may take many forms depending upon the particular application. For example, the crossover ports 226 and 227 may be positioned in many other locations in the bags 200 and 201 with the exact location being determined by the various structures present in the storage of cargo compartment 205.

Of course, it is to be understood that various other arrangements of the plural-chambered devices are possible. For example, two dual-chambered devices may be used in combination with two single devices to take the place of an arrangement which formerly required six single devices. The dual-chambered bags in this foregoing arrangement are used in a location in the bulkhead which contains obstructing devices where single bags cannot be conveniently positioned.

The dunnage devices of this invention may also be used in various other manners in addition to being used in conjunction with a bulkhead system. For example, they may directly contact the merchandise being shored to force it against the walls of a cargo compartment, or they may be used as cushioning devices between these walls and the cargo.

While certain representative embodiments and details have shown for the purpose of illustrating the invention it will be apparent to those skilled in the art that various changes and modifications may be made therein without departing from the spirit or scope of the invention.

We claim:

1. An inflatable member of flexible material for shoring merchandise in a storage compartment, said member comprising:

A. a body formed of opposed plies of pressure retaining flexible material with the peripheral outer edges thereof sealed to form a pressure-tight seam therearound, said body including:
  1. at least two pneumatic chambers therein,
  2. at least one crossover connecting any two such chambers, each crossover having an opening therein so as to provide for a free flow of an inflating medium between the pneumatic chambers, and
  3. a generally V-shaped strip extending substantially around the entire interior periphery of the inflatable member and fitting into the crotch-like contour formed by said body adjacent said sealed outer edges thereof to provide reinforcement therefor; and B. valve means operably connected with said body and extending through the seam and beyond the edge thereof to provide a readily accessible connection to the source of the inflating medium for inflating or deflating particularly when said inflatable member is in the operative position, said valve means comprising:
  1. a pair of sleeve patches, each having a portion attached to one of said body plies and another portion thereof extending outwardly of the sealed edge portion with the sleeve patches lying in superposed relation and joined together to form a passage therebetween to provide an opening into the interior of the body,
  2. a sleeve element in said opening attached to said V-shaped strip with an elongated portion thereof extending into the passage formed by said sleeve patches, and
  3. a wrap layer surrounding at least the elongated portion of said sleeve element and joined to each said sleeve patch at least in the portion extending beyond the sealed edge portion, said valve means thereby providing a single location for controlling the inflation and deflation of the inflatable member.

2. The inflatable member as claimed in claim 1 wherein said body contains at least one open area therein to permit positioning the inflatable member so as to avoid obstructing devices present in the storage compartment.

3. The inflatable member as claimed in claim 1 wherein said body contains two air chambers connected by one said crossover in the lower portion of said body, said chambers and crossover being arranged in a generally U-shaped configuration to provide an open area between said chambers to permit positioning the inflatable member so as to avoid obstructing devices present in the storage compartment.

4. The inflatable member as claimed in claim 1 wherein said valve means is connected through the seam of one of said pneumatic chambers.

5. The inflatable member as claimed in claim 1 wherein said valve means is connected through the seam of one of said crossovers.

6. The inflatable member as claimed in claim 1 wherein the body section is composed of rubberized fabric, the V-shaped strip is tire cord fabric, the sleeve patch is rubberized fabric, the sleeve element is gum rubber, the wrap layer is tire cord fabric with a strip of gum rubber included therewith to seal said wrap layer, and fillers of gum rubber are positioned in the areas where said valve extends through the seam of said body to act as seals therefor.

7. In a system for shoring merchandise in a storage compartment wherein the merchandise is maintained in position by the coacting faces of the merchandise being shored and a dunnage device which includes an inflatable member, the improvement comprising the inflatable member having:
   A. a body formed of opposed plies of pressure retaining flexible material with the peripheral outer edges thereof sealed to form a pressure tight seam therearound, said body including:
      1. at least two pneumatic chambers therein,
      2. at least one crossover connecting any two such chambers, each crossover having an opening therein so as to provide for a free flow of an inflating medium between the pneumatic chambers, and
      3. a generally V-shaped strip extending substantially around the entire interior periphery of the inflatable member and fitting into the crotch-like contour formed by said body adjacent said sealed outer edges thereof to provide reinforcement therefor; and
   B. valve means operably connected with said body and extending through the seam and beyond the edge thereof to provide a readily accessible connection to the source of the inflating medium for inflating or deflating particularly when said inflatable member is in the operative position, said valve means comprising:
      1. a pair of sleeve patches, each having a portion attached to one of said body plies and another portion thereof extending outwardly of the sealed edge portion with the sleeve patches lying in superposed relation and joined together to form a passage therebetween to provide an opening into the interior of the body,
      2. a sleeve element in said opening attached to said V-shaped strip with an elongated portion thereof extending into the passage formed by said sleeve patches, and
      3. a wrap layer surrounding at least the elongated portion of said sleeve element and joined to each said sleeve patch at least in the portion extending beyond the sealed edge portion;
   said valve means thereby providing a single location for controlling the inflation and deflation of the inflatable member.

8. The inflatable member as claimed in claim 7 wherein said body contains at least one open area therein to permit positioning the inflatable member so as to avoid obstructing devices present in the storage compartment.

9. The inflatable member as claimed in claim 7 wherein said body contains two air chambers connected by one said crossover in the lower portion of said body, said chambers and crossover being arranged to form a generally U-shaped configuration to provide an open area between said chambers to permit positioning the inflatable member so as to avoid obstructing devices present in the storage compartment.

10. The inflatable member as claimed in claim 7 wherein said valve means is connected through the seam of one of said pneumatic chambers.

11. The inflatable member as claimed in claim 7 wherein said valve means is connected through the seam of one of said crossovers.

12. The inflatable member as claimed in claim 7 wherein the body section is composed of rubberized fabric, the V-shaped strip is tire cord fabric, the sleeve patch is rubberized fabric, the sleeve element is gum rubber, the wrap layer is tire cord fabric with a strip of gum rubber included therewith to seal said wrap layer, and a filler of gum rubber is positioned in the area where said valve extends through the seam of said body to act as a seal therefor.

PO-1050
(5/69)

UNITED STATES PATENT OFFICE
CERTIFICATE OF CORRECTION

Patent No. _____3,554,135_____      Dated___January 12, 1971___

Inventor(s)___William C Duvall and Stephen L Tomcsak___

It is certified that error appears in the above-identified patent and that said Letters Patent are hereby corrected as shown below:

Column 1, line 34, "installed" should read --inflated--.

Column 5, line 26, "and" should read --operation--.

Signed and sealed this 11th day of May 1971.

(SEAL)
Attest:

EDWARD M.FLETCHER,JR.          WILLIAM E. SCHUYLER,
Attesting Officer              Commissioner of Pater